April 19, 1949.  G. H. BURT  2,467,728
SAWING APPARATUS
Filed Nov. 14, 1946  3 Sheets-Sheet 2
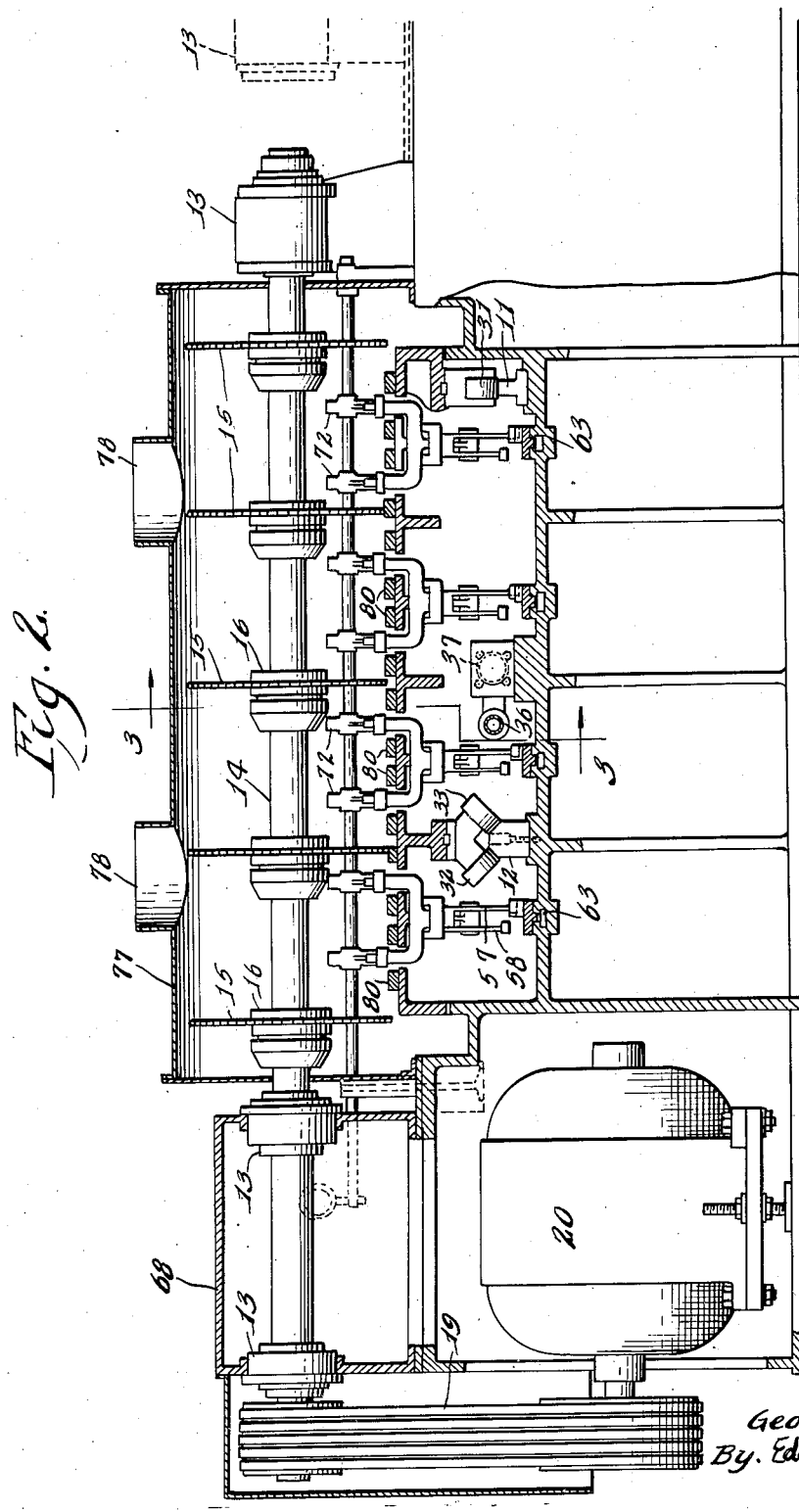

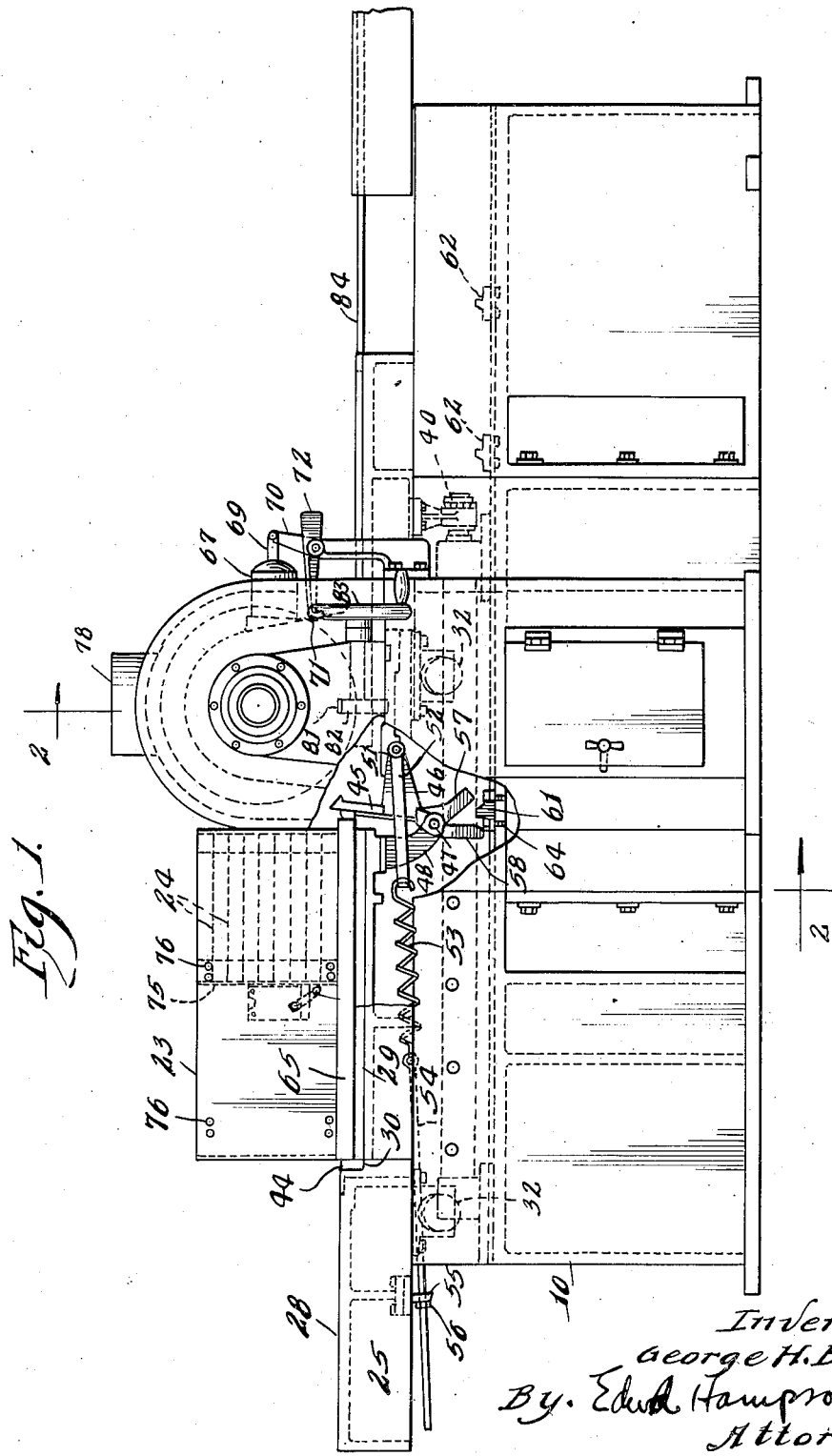

April 19, 1949.   G. H. BURT   2,467,728
SAWING APPARATUS
Filed Nov. 14, 1946   3 Sheets-Sheet 3
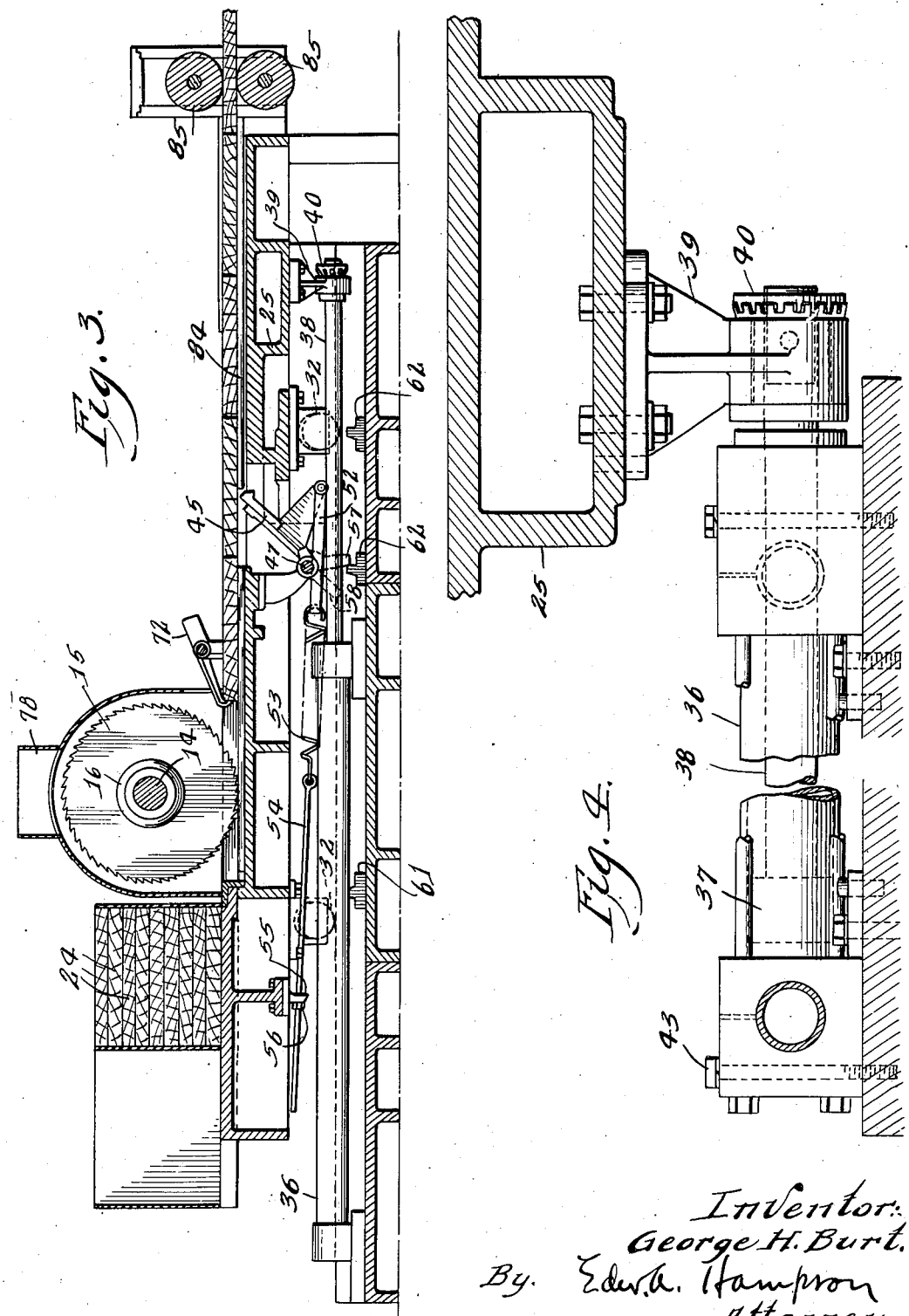
Inventor:
George H. Burt.
By Edw. A. Hampson
Attorney.

Patented Apr. 19, 1949

2,467,728

UNITED STATES PATENT OFFICE 2,467,728

SAWING APPARATUS

George H. Burt, Flossmoor, Ill., assignor to The Celotex Corporation, Chicago, Ill., a corporation of Delaware Application November 14, 1946, Serial No. 709,753

6 Claims. (Cl. 125—13)

This invention relates in particular to a machine which has been developed for the production of tile-form units of uniform size, with parallel opposite edges, and with adjacent sides at right angles one to the other, that is, it is a machine for accurately cutting material to tile form.

The machine is designed for a high rate of production through the provision of an automatic feed hopper, multiple severing elements for forming a plurality of tile-form units on each pass of the machine, and then formed tiles are delivered by the machine to a take-off mechanism whereby the tile-form units may be fed into a production line.

The machine is so designed and constructed that, other than for the loading of blanks into a feed hopper, the such blanks are fed to the cutting devices, carried away therefrom and discharged from the machine without involving any labor or handling so far as the production operation is concerned. It is to be understood, of course, that the machine will require the usual mechanical servicing, and its operation should be supervised as is necessary in connection with the operation of machines generally.

The particular object of this invention is to provide an apparatus for accurately sub-dividing a pre-cut strip of material into a plurality of tile-like units, maintaining, in connection with such sub-division, operational conditions such that the resulting tile-like units are square and are uniform in size. Also it is an object of the invention to provide a machine, as just mentioned, and in connection with which, other than for the labor involved in charging a feed hopper, there is no labor involved in bringing about the sub-division of the material into the finished units which are discharged by the machine into a production line such as is desired for further operations.

Still other and further objects of the invention will be apparent upon consideration of the appended description of the invention when taken in connection with the accompanying drawings and the subject matter thereof as covered in the appended claims.

In the accompanying drawings, Figure 1 is a side elevation of the sawing apparatus hereof with a part broken away to show details;

Figure 2 is a sectional view of the device taken on section line 2—2 of Figure 1;

Figure 3 is a sectional view taken on line 3—3 of Figure 2; and

Figure 4 is an enlarged detail of the connection of the hydraulic cylinder piston rod to the traveling carriage of the device.

Briefly described, the sawing device hereof comprises a bed or base portion on which is mounted, in suitable bearings, an arbor carrying a plurality of saws or other cutting devices. Also mounted for reciprocation on the base there is provided a carriage which receives a sheet of material to be severed and which reciprocates to carry the sheet under and past the saws. Over the rearward end of the reciprocating carriage there is provided a feed hopper from which sheets to be severed are fed successively to the reciprocating carriage. There is carried by the reciprocating carriage a mechanism for securely clamping the sheet to be cut to the carriage, and mounted on the base portion of the machine there is provided a mechanism for removing the cut elements from the reciprocating carriage after its has completed its forward stroke, which results in the severing of the initial blank into several finished units, the units, upon severing, being finished units insofar as the operation of this particular device is concerned. There is, of course, provided suitable means for driving the machine, and there are means provided for receiving the cut units from the machine and for feeding them into a production line, or so far as the machine itself is concerned providing means for getting the cut units away from the machine.

Specifically describing the sawing apparatus hereof, such is erected upon a base 10, the specific form of which is of no consequence since the base 10 is merely a support, and its specific form is dependent upon the desires of the designer, available space, etc. On the base 10 there are provided suitable guide-ways or rails 11 and 12 which comprise the mounting for the reciprocating carriage, which will be described. Also mounted on base 10 there are provided bearings 13 in which there is in turn mounted shaft or arbor 14, and on which shaft there is mounted circular saws or other cutting devices such as abrasive disks, or the like, and which are identified by numeral 15. Saws 15 are appropriately secured on saw arbor 14 by the usual collars, or the like, 16. At its outer end, the shaft or arbor 14 may be provided with a suitable pulley, which, by belts 19, may be driven from a pulley mounted on an electrical motor or power source 20. The details of the drives of the device are unimportant and therefore such will not be further described, it being considered sufficient to merely state that means are provided for driving saw arbor 14.

Suitably supported on the base 10 there is provided a feed hopper 23 which extends across the width of the machine on the feeding side of the saws 15. It will be understood, of course, that pre-cut boards of a length of that across the width of the machine are successively fed into hopper 23 at the top to maintain a stack thereof in the hopper, and that these boards are successively fed from the bottom of the hopper. The such stack of pre-cut boards in hopper 23 are designated by numeral 24.

Also mounted on base 10 and running on rails 11 and 12 there is provided a reciprocating carriage 25, the upper surfaces of which are plane surfaces, one of which, 28, considered vertically, is positioned above the other surface 29 by an amount which is equal to the thickness of the sheets 24 which are to be cut into units. Between the forward edge of the higher top face of 28 of the carriage and the rear edge of the lower top face portion of the carriage there is provided a groove 30 which extends downwardly below the top carriage face portion 29, the purpose of which will be subsequently described.

Carriage 25, on its under side, is provided with rollers suitably mounted thereon and which are identified by numerals 31, 32 and 33. The single roller 31 runs on the top face of previously mentioned T-rail 11, and rollers 32 and 33 run on inclined faces of the Y-formed rail previously mentioned.

Carriage 25 is reciprocated by means of a double acting hydraulic cylinder 36, in which there operates piston 37 on piston rod 38, the outer end of which piston rod is secured to the reciprocating carriage on its under side through bracket 39 to which it is secured by lock washer and nut assembly 40, as is apparent from the drawings. The other end of the hydraulic cylinder 36 is secured to the base portion 10 of the machine by studs 43 in any suitable manner. It is to be understood, of course, that hydraulic cylinder 36 is connected by suitable piping to a source of fluid under pressure, and that suitable valves are provided in such fluid lines to control the cylinder to provide the desired reciprocation of the carriage 25 upon proper manipulation of the valves. The details of the hydraulic cylinder not being of the essence of the invention hereof, the details of construction have, consequently, not been described. It is not necessary that carriage 25 be reciprocated by hydraulic cylinder, such as has been described, and it is, of course, well understood that any other suitable mechanical equivalent may be substituted therefor to reciprocate carriage 25.

In order that the tile-form units sawed on the device hereof may be accurately cut, it is desired that the strips being sawed shall be firmly held in place as they approach the saws and pass under the saws, and that the portions into which the strips of material are being sub-divided shall be securely held in place until after the strip is fully severed, all in order that the sawing may be accurate. There is provided, associated with the carriage, means for securely clamping the material to the carriage bed. Attention has previously been directed to the fact that carriage 25 is formed with two top faces or surfaces 28 and 29, one of which, the rearward portion 28 of the carriage, is elevated with reference to the other, the forward face 29 of the carriage. This difference in elevation of the surfaces of the rear and forward portions of the carriage is dimensionally equal to the thickness of the strip of material to be sub-divided. This construction just described provides at the forward edge of the rear end top surface or face portion 28 of the carriage 25, an abutment 44 which is utilized as a surface against which the strip 24 to be sub-divided is clamped by means of clamping fingers which are located at the forward edge of the forward surface or face portion 29 of carriage 25. By securing the sheet 24, being sub-divided into tile units, between the abutment 44 and the clamping means referred to, the material may be securely clamped in place during the sub-dividing operation, and thus being clamped against a fixed straight edge, square and uniform sub-division of the strip is assured.

The mechanism just above referred to, for clamping a strip 24 against the abutment 44, comprises clamping fingers 45 which are arranged in pairs across the width of the machine, so that normally there are a spaced pair of such clamping fingers provided for clamping in place each of the sections or tile members into which a strip 24 is divided. These clamping fingers 45 are a part of a system which comprises a spring-tensioned snap-over mechanism. The clamping fingers 45 are formed as part of or attached to a pivoted arm 46 which is pivoted on a pin or shaft 47 mounted in a depending arm 48, which is suitably attached to the under side of the forward face portion of carriage 25 adjacent its forward edge. The pivoted arm 46 comprises a crank pivoted on pin 47, and in the end of which crank portion there is mounted a shaft or pin 51. On shaft 51 there is mounted a suitably formed yoke member 52 which extends rearwardly from its pivot point 51 on pivoted arm 46 to the rear of and past pivot point 47 on which arm 46 pivots. To the base of the yoke member 52 there is attached a spring 53 which, at its other end, is attached to rod member 54 which passes through an eye member 55, which is suitably provided on the under side of the rear end face portion 28 of carriage 25, and which eye member 55 loosely mounts the rod member 54 and serves as a pivot or rocking point for nut 56, or the like, suitably secured to rod 54. As a part of pivoted arm 46, there are provided depending trigger members 57 and 58 which, upon contacting suitably provided operating stops, pivot on pivot point 47, consequently pivoting on pivoted arm 46, which carries the clamping members 45, and which, in pivoting, due to the consequent pivoting of shaft 51, carries the tension system, yoke 52, spring 53 and rod 54 through its operative center line, which is a center line extending through eye member 55 and pivot shaft 47. As the tension system is caused to pass below its operative center line through actuation of the trigger member 58, the clamping mechanism is snapped over the inoperative position, and as the tension system is caused to travel above its operative center line by actuation of trigger member 57, the clamping device is snapped to operative clamping position, being that shown in Figure 1, whereby clamping fingers 45, through the tension of spring 53, are firmly drawn against the forward edge of a strip to be sawed and to thus securely clamp the strip, as previously described.

For operating trigger members 57 and 58, just above described, there are provided on the bed of the machine stop members or operating dogs which are preferably adjustably mounted. These stop members are designated by numerals 61 and 62, member 61 being the one provided for operating the clamping fingers 45 to inoperative position. The stop members are preferably mounted in T-slots 63, as shown, and studs 64 may be provided for securing the stop members in adjusted position. Stop member 62 is shown in a second position in dotted lines to illustrate its operative position when a full width strip 24 is being cut into units, its positioning being such that it serves to trip trigger member 58 as the carriage 25 reaches substantially the forward end of its full stroke.

As illustrated in the drawings, the machine is set up for cutting up or severing strips 24 which may be termed of "half" width, and in connection with which operation a filler strip 65 is placed on the forward face portion 29 of the carriage, abutting at its rear against abutment 44 and providing at its forward edge a new abutment against which the strip 24 being cut may be clamped.

The clamping fingers 45 are released at the end of a sawing stroke by the action of trigger members 58 striking stop members 62. When trigger members 58 contact stops 62, arm 46 pivots on pin 47 causing pivot point 51 to rotate clockwise to below the neutral axis of the snap-over mechanism, and the tension member then completes the movement of the arm 46 and clamping fingers 45 mounted thereon to inoperative position, and thus the individual tiles or units into which the original strip has been cut are released. In order that the cut units shall not travel back with the carriage on its return stroke, there is provided a latch mechanism which prevents them from going back with the carriage on its return stroke. The latch mechanism comprises a solenoid 67 which is suitably mounted on a housing member 68. The plunger 69 of the solenoid is connected to a crank arm member 70, one arm of which comprises a latch portion 71, which is provided with a counterweight portion 72 which biases latch 71 to inoperative position, as shown in Figure 1 of the drawing. At the end of a forward stroke of the carriage 25, a switch in the solenoid system is closed energizing the solenoid and drawing plunger 69 inwardly. The movement of the plunger 69, which is connected to crank arm 70, oscillates the crank arm in a counter clockwise direction and causes latch 71 to move down into position behind the rear edge of the cut units on carriage 25. With the latches 71 in position, it of course follows that as carriage 25 moves back on its return stroke, the tile units are prevented from returning with the carriage, and they are thus removed from the carriage and may be taken away in any desired manner. As carriage 25 reaches substantially the end of its return stroke, the current energizing the solenoid is broken in any suitable manner and the solenoid 67, being deenergized, it of course follows that a counter-weight 72 becomes effective to return latch 71 to inoperative position. In connection with the immediately foregoing description, reference has been made to an electrical system controlling solenoid 67, although such electrical system is not shown in the drawings. The wiring and the switches required for the control of the solenoid, as described, are so generally known that it was felt unnecessary to further complicate the drawings by including these details. There is involved merely a suitable supply of electrical current for the solenoid, with a pair of three-way switches incorporating in the current, with one of the switches located substantially at each end of the stroke of the carriage 25 to be actuated at the end of the stroke. Various details of the construction which have not been specifically referred to previously, but which are believed to be obvious from the drawings and thus require no extended description, will be briefly referred to as follows:

The machine is designed to operate on full width or half width sheets 24. As illustrated, the hopper is shown as containing half width sheets; and it is to be noted that in such case the rear wall, or partition 75, is moved up and secured in place so that only the forward half of the hopper is in use. This partition 75 is designed so that it may be mounted either centrally of the hopper or near the back to accommodate the full width boards; in either case the holes or openings 76 being provided in the hopper structure for securing the hopper partition in place in accordance with the foregoing. Of course, preferably a protective hood is provided over the saws, and this may be provided with connections for attaching suction pipes for carrying away sawdust, or the like, the hood being identified by numeral 77 and the pipe connections by numeral 78.

On the upper surface of forward face 29 of the carriage there are suitably secured hardwood strips which provide the actual surface on which are carried boards 24 while being sawed. These strips are designated at 80 and they are provided chiefly so that the saws may cut completely through the board without danger of hitting the under metal supporting face. If the hardwood strips are not spaced correctly, so that the saws will run between the strips, the saws will cut slightly into the upper surface of the strip and no damage is done. For ease in changing saws or adjusting saws or the like the outer bearing 13 is preferably mounted so that it may be readily moved out of the way, as indicated in Figure 2 in dotted lines. It will be understood that the outer bearing 13 is mounted in suitable T-slots, or the like, in the base structure 10, and there is provided a suitable rack 81 and pinion 82 for moving the bearing 13 backward and forward, there being provided a hand wheel 83 for turning the pinion to accomplish the desired results. For removing the cut units from the reciprocating carriage, there are provided elongated fingers 84, preferably of hardwood, which extend into spaces between the hardwood strips 80, and the upper surfaces of which are substantially level with the upper surfaces of strips 80. Thus, as the cut units are drawn off the reciprocating carriage, they will pass on to the fingers 84, and as succeeding units are discharged from the carriage, preceding units will be pushed into engagement with take-off rolls 85, which will take away the units to any subsequent conveyor, or the like.

It is believed that the operation of the sawing apparatus hereof will be entirely clear to those skilled in the art, but the operation thereof may be briefly summarized as follows:

The apparatus comprises a gang-saw device for severing a wide strip of material into a number of units, and comprises a saw arbor with properly spaced saws mounted thereon, and a carriage which reciprocates to carry the sheet to be cut under the saws. A pile of strips of the material may be placed in a hopper which is provided, and as the carriage reciprocates, the lowermost sheet is carried out from under the pile of sheets, passes under the saws and is severed. As the carriage begins its forward movement, means are provided for securely clamping the sheet of material to the carriage so that it may not move during the sawing operation, and thus accurately cut units may be produced. As the sawing of the strip of material is completed, means is provided for tripping the clamping device so that the cut units are released from the carriage and at the same time means come into operation to prevent the cut units from passing back under the saws on the return stroke of the carriage or, stated the other way, such means relatively remove the cut units from the carriage. The apparatus which has been described provides for almost an automatic reduction of strip material to a plurality of units, and requires substantially no attention other than that of seeing that the hopper is kept charged with strips to be sawed. Of course, mechanical maintenance of the apparatus is required, but if the strips are continuously supplied to the hopper, the machine takes the strips successively, one at a time, passes them through the gang saws and discharges the cut units from the other end of the apparatus, all continuously and without requiring any handling whatsoever. Particularly, due to the fact that the strips are securely clamped to the carriage while they are passing through the saws, and until the strips are completely severed, it results that accurate sawing of the strips is obtained and the severed units are maintained square with parallel sides and of uniform dimensions.

The apparatus hereof having been described in detail, I claim:

1. In a tile machine in combination, a saw arbor, spaced saws on the saw arbor, a reciprocating table, means reciprocating the table under the saws to divide a unit sheet into a plurality of tile, an abutment on the table, means carried by the table and clamping a unit on the table against the abutment and means restraining return movement of tile with the table on return traverse of the reciprocating table subsequent to a forward stroke thereof whereby a unit clamped to the table has been severed into a plurality of tile.

2. In a tile machine, in combination, a saw arbor, spaced saws on the saw arbor, a reciprocating table, means reciprocating the table under the saws to divide a unit sheet into a plurality of tile, an abutment on the table, clamping means mounted on and carried by the table, means operative on the forward stroke of the table and positioning the clamping means to clamp a unit on the table and against the abutment, means operative at the end of a forward stroke withdrawing the clamping means from clamping position and means restraining return movement of tile on return traverse of the reciprocating table subsequent to a forward stroke thereof whereby a unit clamped to the table has been severed into a plurality of tile.

3. In a tile machine, in combination a base and mounted thereon a saw arbor, spaced saws on the arbor, a reciprocating work table mounted to reciprocate under the saws, pivotally mounted oscillating fingers at the front edge of the table, means carried by the table selectively biasing the oscillating fingers to clamping and to non-clamping position, an abutment on the work table and means carried by the table and operative to bias the oscillating fingers to clamp a work piece on the table to the abutment.

4. In a tile machine, in combination a base and mounted thereon a saw arbor, spaced saws on the arbor, a reciprocating work table mounted to reciprocate under the saws, pivotally mounted oscillating fingers at the front edge of the table, means carried by the table selectively biasing the oscillating fingers to clamping and to non-clamping position, an abutment on the work table and means carried by the table and operative to bias the oscillating fingers to clamp a work piece on the table to the abutment, the means operative to bias the clamping fingers comprising a spring tensioned snap over mechanism including depending actuating fingers, and means mounted on the base for actuating said actuating fingers.

5. In a tile machine in combination, an arbor, saws on the arbor, a reciprocating carriage, a longitudinal slot extending lengthwise of the carriage means projectible through the slot in the carriage and behind the material carried by the carriage and means operative at substantially the end of the forward stroke of the carriage projecting the projectible means through the slot in the carriage, whereby the material is restrained from returning with the carriage on its return stroke with consequent removal of the material from the carriage.

6. In the combination claimed in claim 5, the projectible means for removing material from the carriage comprising a pivoted member, the member weight biased to inactive position and mechanical means connected thereto and operative to project the projectible means to operative position.

GEORGE H. BURT.

REFERENCES CITED

The following references are of record in the file of this patent:

UNITED STATES PATENTS

| Number | Name | Date |
|---|---|---|
| 1,024,628 | Grover | Apr. 30, 1912 |
| 1,570,318 | Pollard | Jan. 19, 1926 |
| 1,588,345 | Brown | June 8, 1926 |